(12) United States Patent
Legarda

(10) Patent No.: US 6,368,111 B2
(45) Date of Patent: Apr. 9, 2002

(54) SYSTEM AND METHOD FOR INTERACTIVELY SIMULATING AND DISCOURAGING DRUG USE

(76) Inventor: Juan Legarda, Roncesvalles 2, Madrid (ES), 28007

( * ) Notice: Subject to any disclaimer, the term of this patent is extended or adjusted under 35 U.S.C. 154(b) by 0 days.

(21) Appl. No.: 09/102,962

(22) Filed: Jun. 23, 1998

Related U.S. Application Data

(60) Provisional application No. 60/050,654, filed on Jun. 24, 1997.

(51) Int. Cl.[7] .......................... G09B 19/00; G09B 5/00; G09B 7/00; A63F 9/24; G06F 17/00
(52) U.S. Cl. .................. 434/236; 434/307 R; 434/323; 463/1; 463/6; 463/7; 463/9; 463/23
(58) Field of Search ................................ 434/236, 237, 434/118, 258, 307 R, 323; 463/1–9, 23

(56) References Cited

U.S. PATENT DOCUMENTS

| | | |
|---|---|---|
| 3,916,534 A | 11/1975 | Riccio |
| 4,734,038 A | 3/1988 | Dennis |
| 5,035,625 A | 7/1991 | Munson et al. |
| 5,362,238 A * | 11/1994 | Slavin .......................... 434/65 |
| 5,367,454 A | 11/1994 | Kawamoto et al. |
| 5,385,474 A | 1/1995 | Brindle |
| 5,546,943 A | 8/1996 | Gould |
| 5,596,994 A | 1/1997 | Bro |
| 5,676,551 A * | 10/1997 | Knight et al. ................ 434/236 |
| 5,678,571 A | 10/1997 | Brown |
| 5,730,654 A | 3/1998 | Brown |
| 5,749,580 A | 5/1998 | Lopez |
| 5,813,863 A * | 9/1998 | Sloane et al. ................ 434/236 |

FOREIGN PATENT DOCUMENTS

| | | |
|---|---|---|
| WO | WO 8501667 A1 | 4/1985 |
| WO | WO 9737738 A1 | 10/1997 |

* cited by examiner

Primary Examiner—John Edmund Rovnak
(74) Attorney, Agent, or Firm—Hughes Hubbard & Reed LLP; Ronald Abramson

(57) ABSTRACT

A system and method is disclosed for interactively simulating and discouraging drug taking behavior, in which a simulated ingestion of drugs provides an initial enhanced sensation of movement and sound, and apparent enhanced player performance. After a determined time, the effect wears off, the player must take time to obtain and take another dose. The scenario is repeated, but with each repetition, tolerance to the drug grows, the "highs" are shorter, and a growing percentage of the player's time must be devoted to obtaining and taking the drugs. A series of repetitions turns initial elation into frustration and strongly discourages drug use. The invention is illustrated by an implementation in the form of a modified multimedia motorcycle racing game.

40 Claims, 19 Drawing Sheets

SYSTEM AND METHOD FOR INTERACTIVELY SIMULATING AND DISCOURAGING DRUG USE

This application claims the benefit of U.S. Provisional Patent Application Serial No. 60/050,654, filed Jun. 24, 1997.

FIELD OF INVENTION

This invention generally relates to the field of cognitive modification, and more particularly to the utilization of technological means for simulating the deleterious effects of drug usage and thereby discouraging the use of drugs by youngsters.

BACKGROUND OF THE INVENTION

Use of addictive drugs by young people is a tremendous and tragic problem worldwide. Current approaches to this problem include international, military and police efforts to control the production and interdict the flow of addictive drugs, as well as a diverse array of programs involving education and role models that are designed to deter youngsters from using drugs.

The present invention focuses on the "user side" of the problem. However, rather than using conventional passive media such as stories, books, or videos, the present invention seeks to employ more active delivery methods in order to increase the power and effectiveness of the anti-drug message.

It is well established that interactive video, arcade, handheld and multimedia computer games capture the attention of young people as do few other toys. It occurred to me that it might be possible to use these particular interactive media, combined with the information I have gathered professionally regarding the patterns of drug use and addiction, to create for youngsters a strong and lasting predisposition against ever getting involved with drugs.

Drug taking is characterized by an initial "high," followed by a depressed state as the drug wears off. Repeated ingestion results in "tolerance," that is, less of a high for a given dose, a shorter high, and ever deepening states of depression that follow. Considerable anxiety and preoccupation surround the expensive process of securing another dose. Increasing the dosage can temporarily counteract the development of tolerance, but the subsequent bouts of depression will typically deepen. Further, in increasing the dosage (or dealing with drugs of unknown strength) it is very easy to self-administer an overdose, which can readily kill. With some drugs, there are strong withdrawal effects when an established habit cannot be sustained. Obviously, drugs constitute a "disaster area" for our youth, and a major ongoing threat to society.

SUMMARY OF THE INVENTION

It is an object of the present invention to harness the most powerful interactive media available in order to deliver a compelling and lasting anti-drug message to young people.

Further objects of the invention include the following:

- to provide a simulated experience of actually making a decision whether or not to take a dose of drugs, and then to demonstrate the effects of that decision.
- to provide a system that may be used at any time of the day or week and is not limited to certain physical or psychological sessions.
- to provide a versatile system that can be used alone; can be used to provide "booster" sessions for renewed impact or to reinforce other treatments; can be used to deter use by people who have never used drugs; or can be used to treat people who have been addicted.
- to provide specific implementations of the invention in a variety of embodiments, so as to have the option of obtaining reinforcement either by readministering the original embodiment, or by administering different embodiments, over a period of time.
- to provide different and alternative implementations that target different drugs.
- to encourage situations wherein a subject who has used the invention and its simulated option to take drugs, will suggest to another subject not to use the simulated drug option.

The objects of the invention are achieved through multimedia electronic games that may be adapted to run in a variety of forms on any of a number of state-of-the-art gaming platforms. In such a game, a simulated ingestion of drugs provides an initial enhanced sensation of movement and sound, and apparent enhanced player performance. After a determined time, the effect wears off, the player has to attend to the preoccupations of taking another dose. The scenario is repeated, but with each repetition tolerance to the drug grows, the "highs" are shorter lived, and a growing percentage of the player's time must be devoted to obtaining and taking the drugs. After a series of repetitions it becomes clear that rather than enhancing the player's ability to play the game, the drug taking has become a serious limitation that completely frustrates any concerted effort to play the game competitively.

As shown in the description that follows, and in the accompanying drawings, the invention has been implemented in the form of a motorcycle racing game on a "multimedia PC" platform. However, as further explained in such description, the principles of the invention could equally well be implemented in any of a variety of electronic games that pit the user's skill against the computer, or indeed against other users, and on any of a variety of gaming platforms.

DETAILED DESCRIPTION OF THE PREFERRED EMBODIMENT

Typical Operation of the Invention

Figure 1:
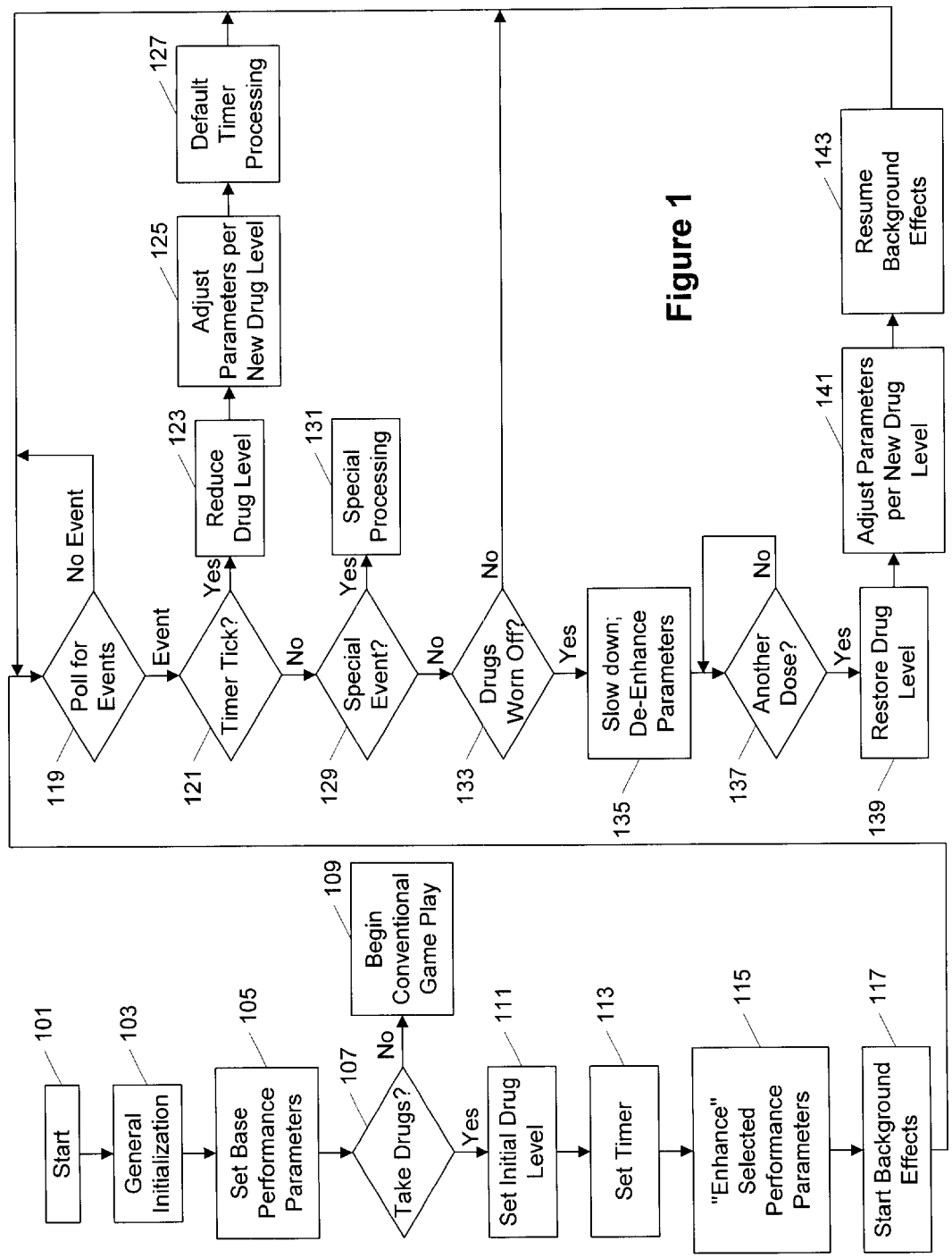
FIG. 1 is a flow chart showing the overall operation of the invention.

FIG. 1 is a flow chart showing the typical mode of operation of the invention in the context of an interactive electronic game. It is important to recognize that the principles of the invention, as illustrated in FIG. 1, could be implemented in an unlimited number of completely different interactive game programs, and furthermore, that such principles are not specific to any particular additive drug. Indeed, the flowchart in FIG. 1 itself represents a specific embodiment in which certain design decisions not dictated by the principles of the invention have been made, as a matter of arbitrary choice or for ease of illustration. FIG. 1, therefore, should not be understood as defining the limits of the invention.

In FIG. 1, the program begins in a "Start" state, 101. General initialization 103 as appropriate for the type of game involved then follows. Either following step 103 (as shown here for clarity) or as part of step 103, certain performance parameters for the game are set to default or base levels, 105.

The user is then presented with a choice 107 to take or not to take a simulated dose of drugs. If the user chooses not to take the drugs, conventional gameplay 109 follows.

If the user opts to take the drugs, a further series of initialization steps (111 to 117) follows. An initial drug level is set, 111. A timer is started, 113. The selected performance parameters are "enhanced"—that is, increased or decreased in order to give the user apparently superior performance characteristics, or to give inferior characteristics to game opponents and/or antagonists. Background effects (music, etc.) are started, 117 (a normal initialization step which has been delayed).

The game then enters an event loop, shown here as an event polling step 115.

On each "timer tick" 121 the drug level is examined and possibly reduced by a certain amount 123, and the performance parameters are optionally adjusted 125 in accordance with the new drug level. Default timer processing 127 handles the normal processing that must occur on every timer tick in a game of the type involved. (Other normal processing, such as processing of user input control events, is assumed but not shown.)

The game may define "special events," such as collisions, fight sequences, etc., which are to be handled, for example, more benignly than normal, in order to augment the perception of enhanced performance. Such special events are detected 129 and processed as desired 131.

Finally, when the drug level has been sufficiently reduced by repetitions of step 123, a "drugs worn off" condition arises, which is detected in step 133. If step 133 detects that the drugs have worn off, a cycle of steps 135–143 are performed before gameplay is continued.

First, the player slows down and/or stops (shown here as a sudden stop) 135; performance parameters, if still enhanced, are disenhanced, and background events are suspended.

The user is then presented with a decision whether or not to take another dose of drugs 137. In this example, the only way for the user to proceed with the game is to take another dose. A "Yes" response results in a full or partial restoration of the drug level 139, corresponding adjustment of parameters 141, resumption of background effects 143, and resumption of play in the event loop 115.

The foregoing illustrates the characteristics of a typical game that incorporates the principles of the invention. Variations and extensions of the modes of operation shown will be obvious, with respect to game implementation, to those skilled in the art of electronic game implementation, and with respect to game design, to those versed in the pharmacology of addictive drugs.

Operation of a Working Version of the Invention—a Modified Motorcycle Racing Game As previously stated, the invention as illustrated in FIG. 1 can be implemented in an unlimited number of interactive games, with the mode of the interaction being based on a variety of addictive substances. The example chosen by the inventor for purposes of demonstration is based on a motorcycle racing game, and is targeted at the drug cocaine.

This example has been implemented to the point of an operable working prototype. It is a modification of an existing popular multimedia motorcycle racing game, "Cyclemania" by Compro Software Systems Ltd. of Israel. Copies of the unmodified game are available through ordinary entertainment software distribution channels. The modification provides an option at the start of the game to play in either conventional mode, without drugs, or to play in a different mode, with cocaine.

Cyclemania is a circa 1994 game, and the demonstration was created on a limited budget. While it illustrates the principles of the invention, and is the preferred embodiment at this time, obviously much more could be done on the more powerful platforms and software environments that exist as of the date of this patent application. Such platforms include powerful dedicated arcade machines, virtual reality consoles with head mounted displays, videogame systems, such as the Nintendo 64®, Sony Playstation® and Sega Saturn® videogame systems, personal computers based on Intel® or other CPU chips, as well as networked computers running distributed interactive game applications. The preferred embodiment runs on modest PC equipment. A minimal setup requires a 486-66 or faster processor, 8 MB or more of RAM, a SoundBlaster® or other recognized sound card and a 2× or better CD ROM drive. The details of the preferred embodiment in no way limit the invention or the attached claims.

Figure 2:
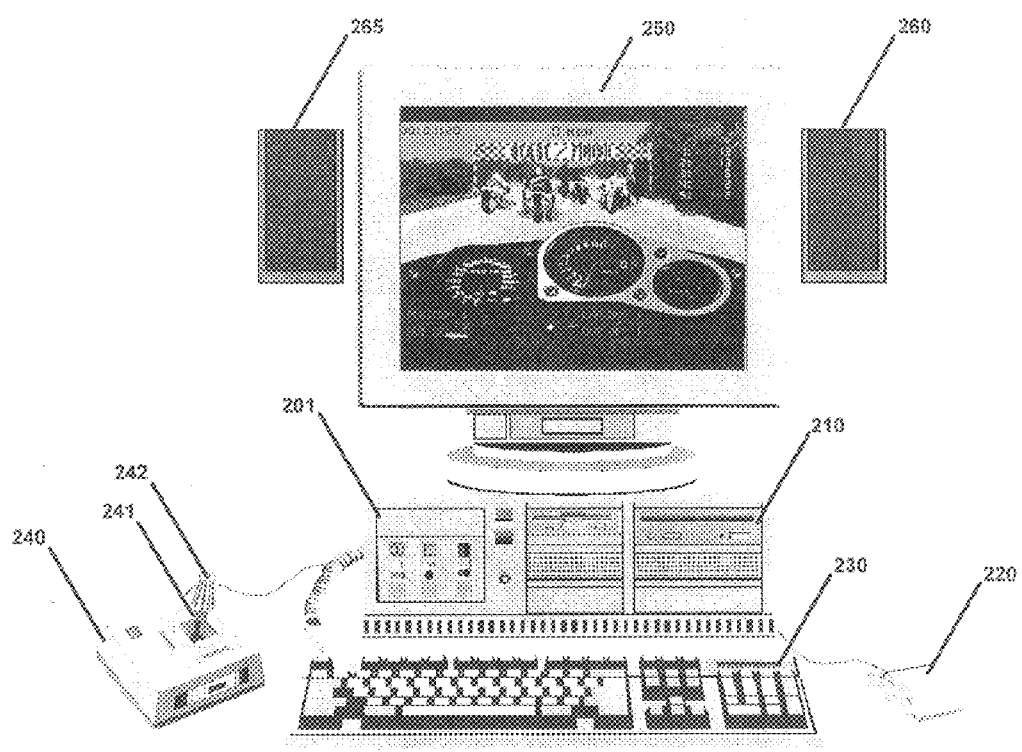
FIG. 2 depicts a typical multimedia computer gaming system, shown playing the conventional version of the present game.

FIG. 2 illustrates a typical computer setup for playing multimedia games of the "arcade/action" variety. It comprises a CPU 201, video monitor 250, high speed (2× or better) CD drive 210, joystick 240, keyboard 230, stereo speakers 260, 265, and optionally a mouse 220. The video monitor 250 is shown in FIG. 2 displaying a typical scene from a conventional (non-drug) playing session with the Cyclemania game.

Figure 3:
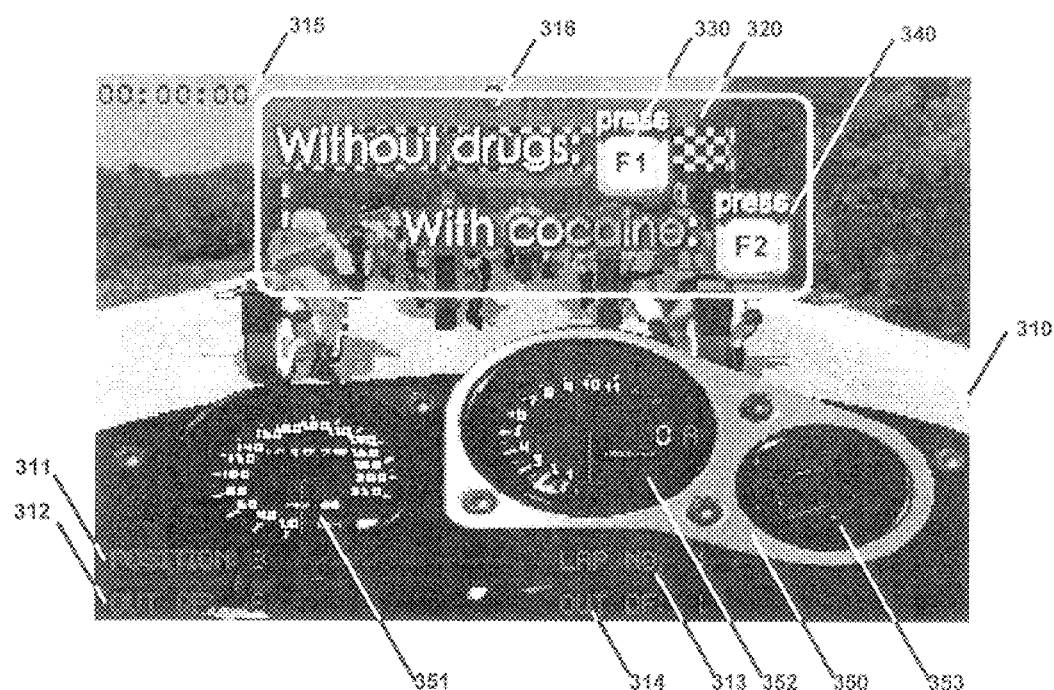
FIG. 3 is a screen shot showing the opening option to play a conventional game, or to play the game with cocaine.

FIG. 3 is a "screen shot" (a printout of a captured full-screen image from video monitor 250) of the first screen of the modified Cyclemania game that appears after the opening credits and initialization. The background display 310 is the same as in the unmodified game. Overlayed on this display is a dialog box 320 that automatically appears which presents the keyboard selectable choice 330, 340 to play a conventional game "without drugs," or to play "with cocaine," using keyboard function keys "F1" or F2." The figures also show the motorcycle instrument panel 350 (with analog, metric speedometer 351, tachometer and gearshift indicator 352 and gas gauge 353), overlayed position and lap indicators 311–314 and timer 315, showing elapsed time in the game. Partially obscured by the dialog box in this figure is a digital "miles per hour" speed display 316 at top center (in addition to the analog, metric speedometer 351). The player's start position is fixed as the third of six riders.

A Walkthrough of a Conventional Play Session

Figure 4:
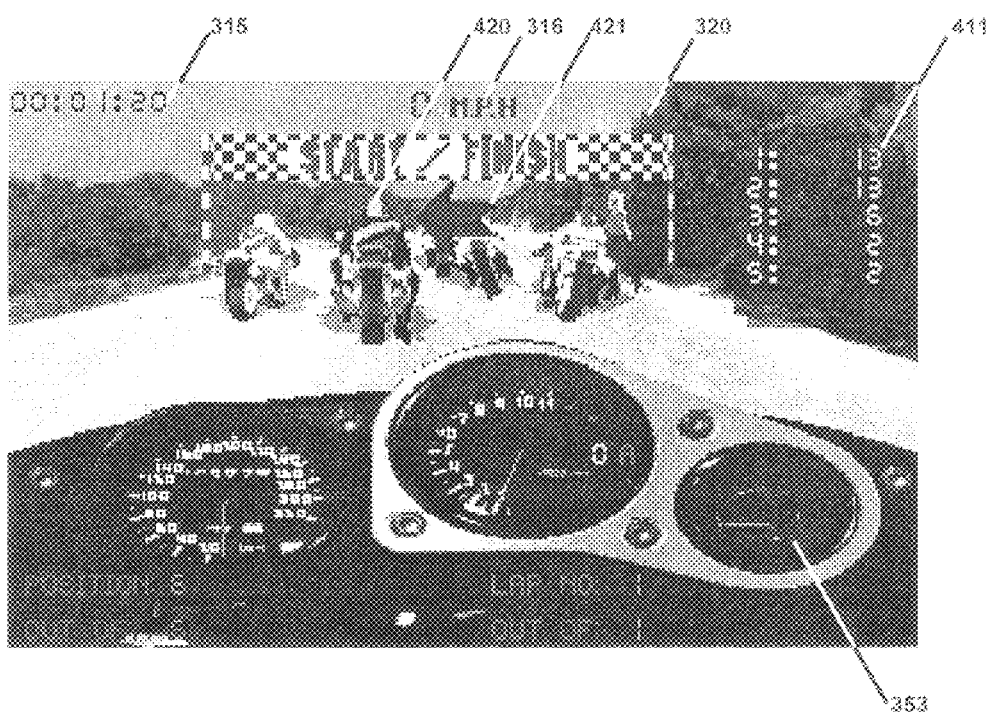
FIGS. 4–8 are screen shots showing gameplay with the conventional motorcycle racing game.

FIG. 4 shows the start of a conventional game. As is typical in games of this genre, the program designers have gone to great lengths to provide for realism in vehicle physics and gameplay. This particular game is notable for the realism of the scenery and the accompanying 3D terrain generation, providing (without drugs) a breathtaking simulated ride through actual roads in Israel.

The user must acquire considerable skill to turn in a competitive performance in the conventional game. FIG. 4 shows that at the start of the game an additional status panel 411 becomes visible showing where the player 420 (initially pointed out by arrow 421) stands in relation to the five other riders in the race. One second into the game, as shown in timer 315, the player has already fallen to last place, just trying to get the bike moving.

Figure 5:
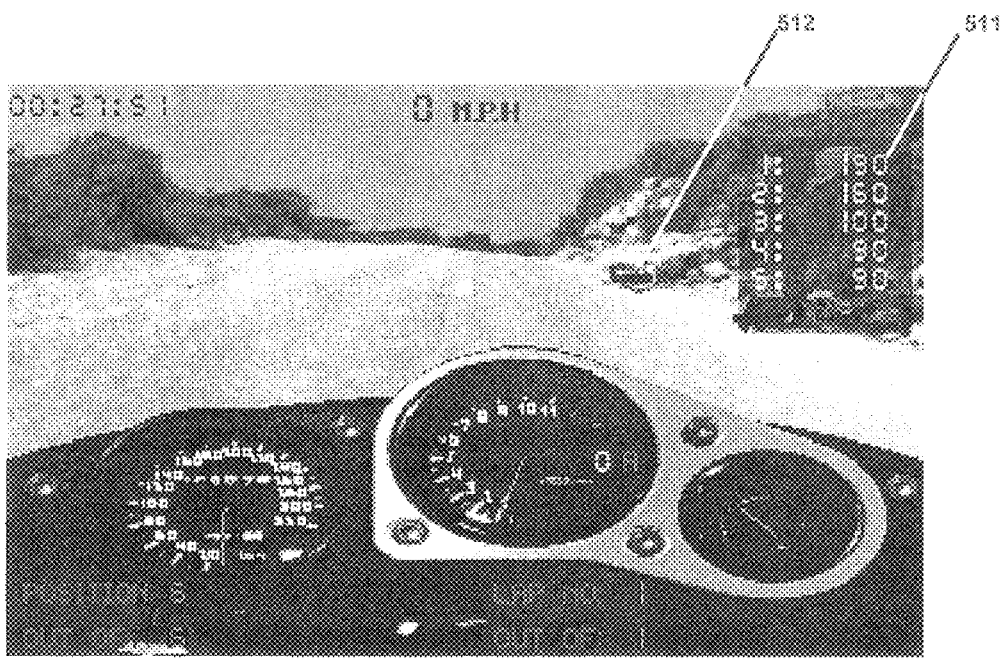

The bike quickly accelerates to speeds, upwards of 150 m.p.h. However, turns must be carefully executed at this speed, or the bike will wipe out with disastrous consequences. FIG. 5 shows the immediate aftermath of such a wipeout (biker 511 and bike 512 flat on the ground!).

Figure 6:
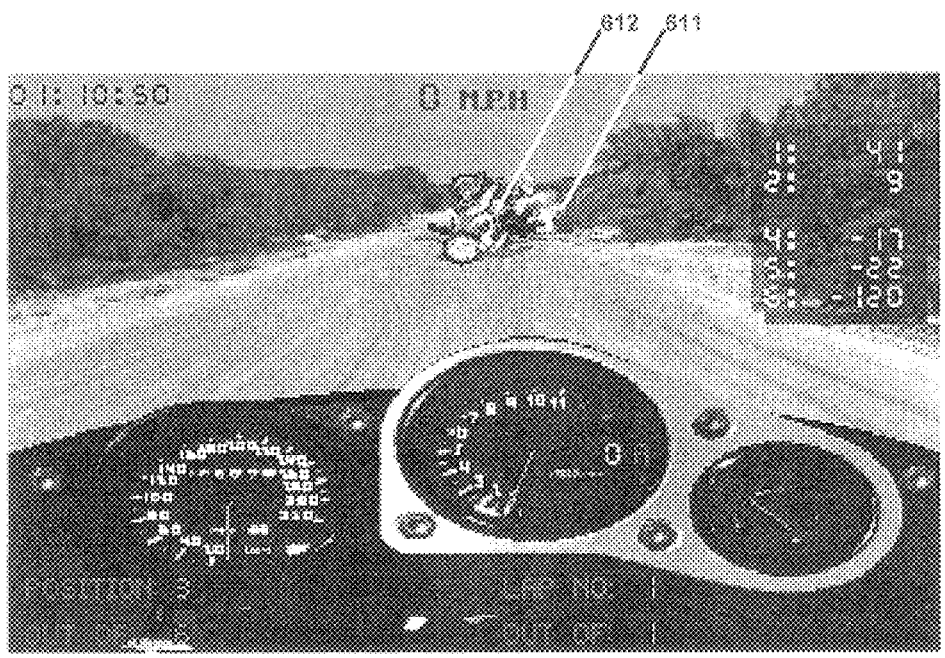

It is possible in the conventional game to start catching up on the group. FIG. 6 shows the player 611 having advanced to third place, attempting to overtake the second place bike 612. However, a slight collision between two bikes flattens our player again, which in the virtual world only results in sending him or her to last place.

Figure 7:
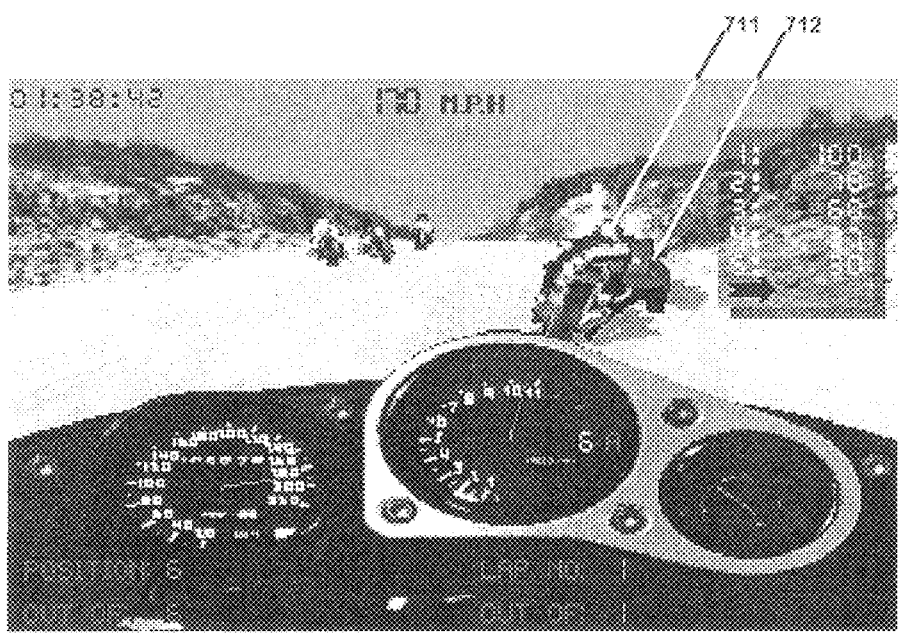
Figure 8:
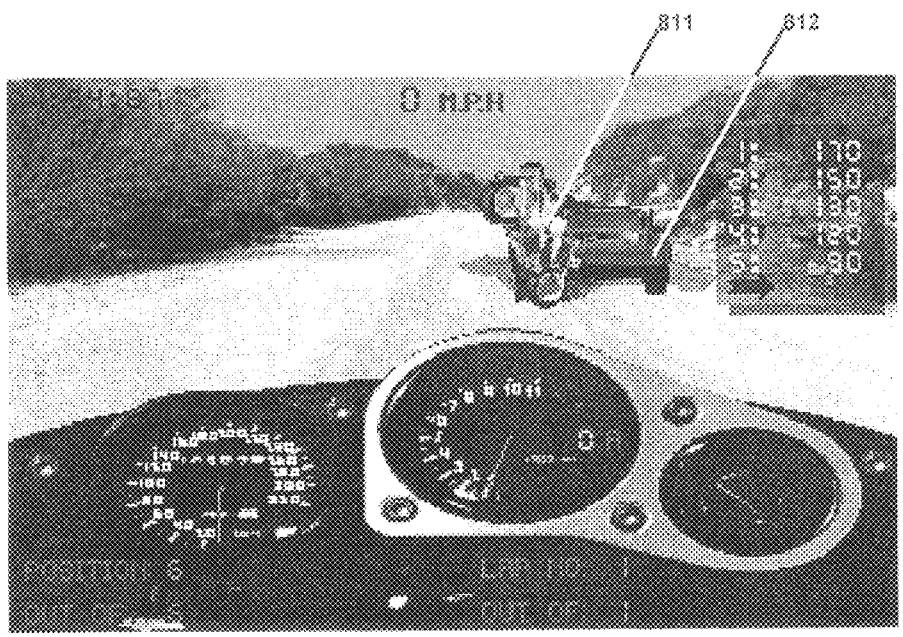

Trying once again to catch the others, the player, 711 in FIG. 7, comes up on a "slow moving" vehicle (Porsche®) 712. Not surprisingly, as shown in FIG. 8, not going around the slower vehicle, results in a crash 811, again sending the player back to last place. Despite such potential setbacks, with effort and learning, the conventional game can be mastered and won.

Description of GamePlay "With Cocaine"

The present invention is illustrated when the user, presented with the innocent looking choice in FIG. 3, selects, via the keyboard the simulated option 340 to take cocaine. The player's computer character then says "Whoa what a rush!" and the modified game begins.

Figure 9:
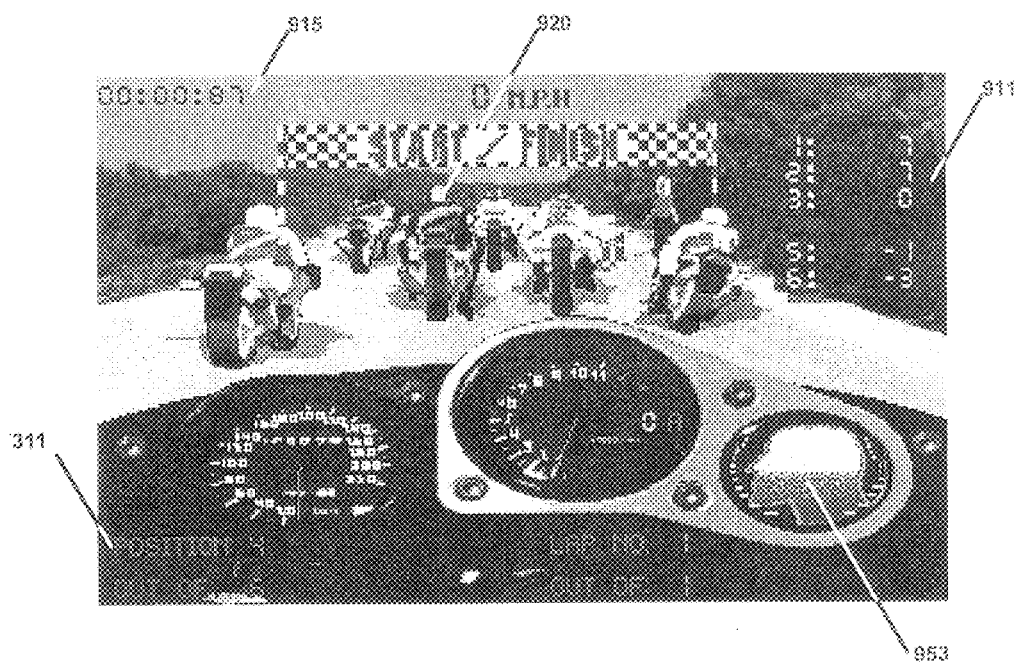
FIGS. 9–13 are screen shots showing gameplay with the motorcycle racing game modified in accordance with the present invention.

FIG. 9 shows the start of the modified game. This scene is similar to FIG. 4 of the conventional game, except that gauge 353 in FIG. 4 has been replaced in FIG. 9 by a head-shaped bar-graph 953. This bar graph serves as a form of "drug-o-meter" showing how much drugs remain in the player's "head." The bar is rendered in color, with red at the bottom and changing to amber in the middle, and yellow at the top. When the "cocaine" option is selected at the beginning of the modified game, and whenever the user "refills" with the drug during the course of play, the bar graph moves from empty to full in an animated sequence over approximately two seconds, giving the visual effect of filling one's head with a "snort" of cocaine. A hissing sound effect is provided for accompaniment.

Figure 10:
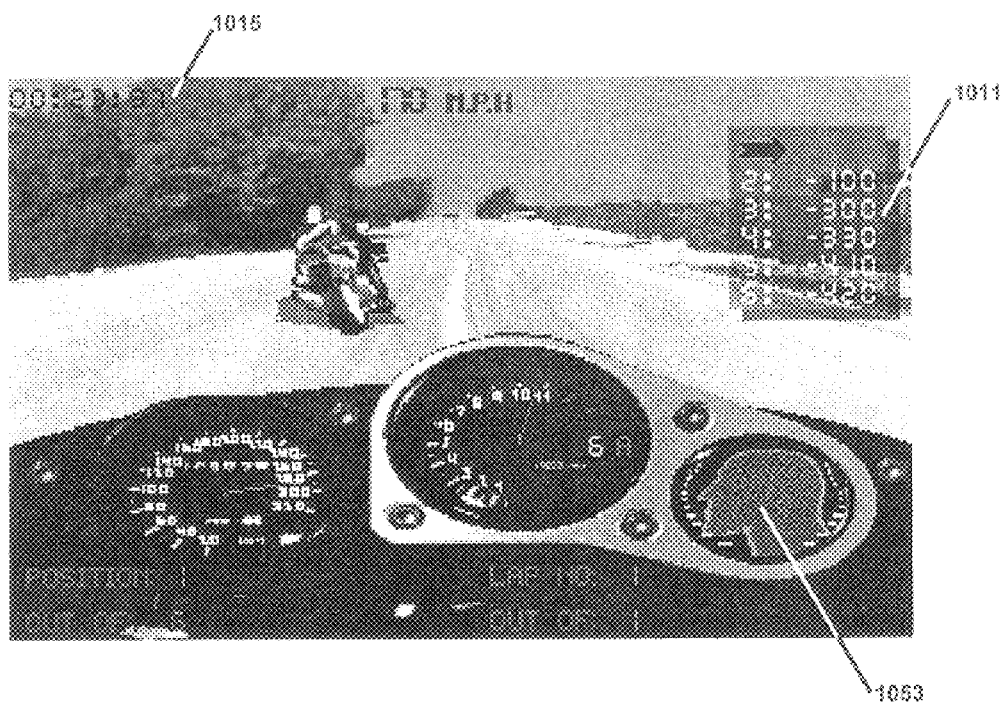

After this brief interlude, the game begins. The clock begins to roll, but—unlike the conventional game—the other bikes will not start moving until the player's bike is underway. The user here gets off to a reasonable start in fourth place (tied for third according to panel 911). Once all the bikes blast away, the player weaves through all of them almost immediately and surges into first place, winding the bike up to about 170 m.p.h. (FIG. 10).

Figure 11:
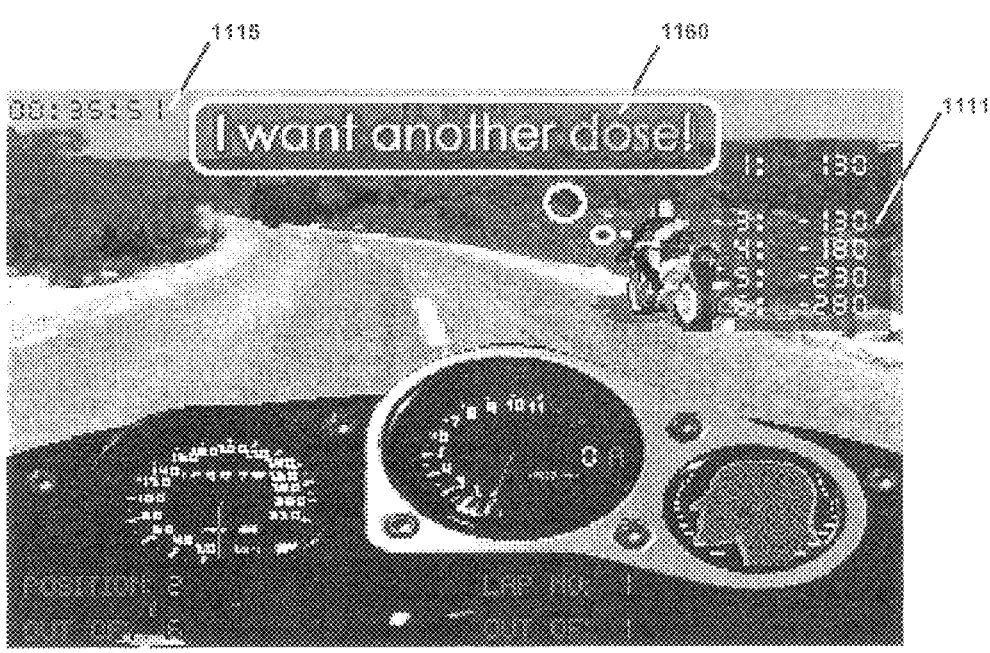

The bike will not fall over in turns, leaps over overtaken and oncoming traffic and obstacles (including opponent's bikes, pedestrians, horses, etc.), and is essentially unstoppable. However, as shown in the "head" indicator 1053, the drug inevitably wears off. Clock 1015 in FIG. 10 shows the situation 23 seconds into the game. The player surges along in first place for about another five seconds, and then completely runs out of drugs at about 30 seconds. This is evidently unbearable, for the player slams on the brakes, decelerates from 170 to 0 m.p.h. in a handful of seconds, and at about 35 seconds on clock 1115 comes to a full stop at the side of the road as shown in FIG. 11. There is only one thing on his or her mind: a dialog 1160 appears in the form of a "thought bubble," saying "I want another dose!" As shown in panel 1111, the closest rider behind has already blasted by.

Getting another dose is not really an "option" in this embodiment. It is a necessity. The player can't answer "no" to this question. The only way out (short of flipping the power switch) is to hit the escape key, thereby bringing up the option to quit, resume, or start a new game. There is no way to continue the modified game, once started, without continuing to take drugs.

Hitting the Return (Enter) key gets the player the needed dose. By the time the player finishes snorting up, all of the other bikes have zoomed by. The player, with some effort, can get back into a reasonable position. But it starts to get harder with each iteration, as the duration of the "high" from the dose of cocaine gradually tails off over repeated doses from the initial duration of 30 seconds on the game clock down to the 10 to 12 second range.

Figure 12:
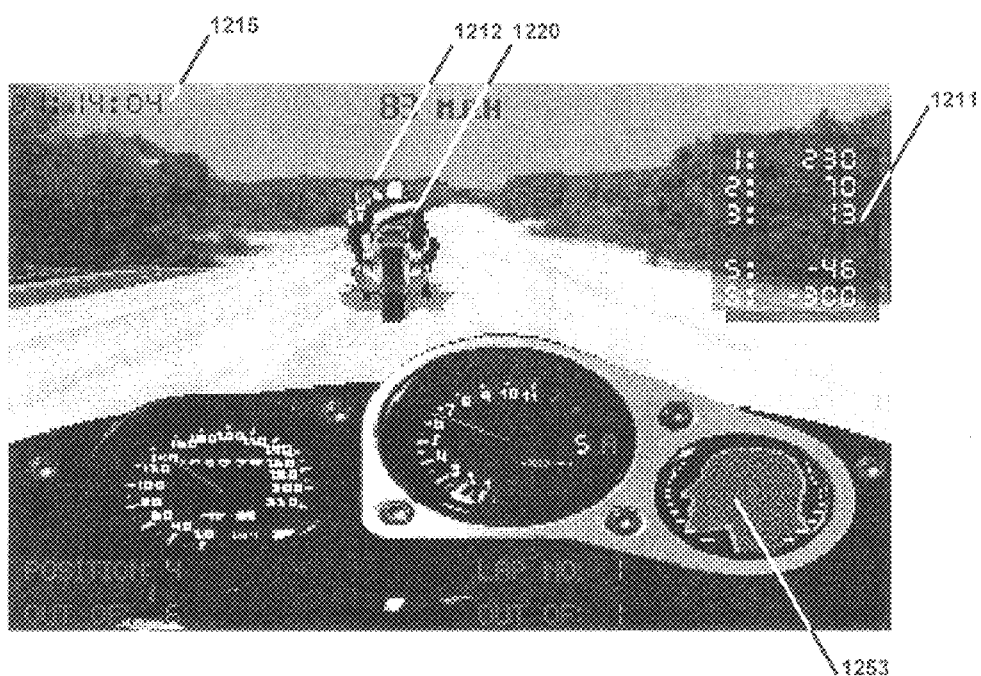
Figure 13:
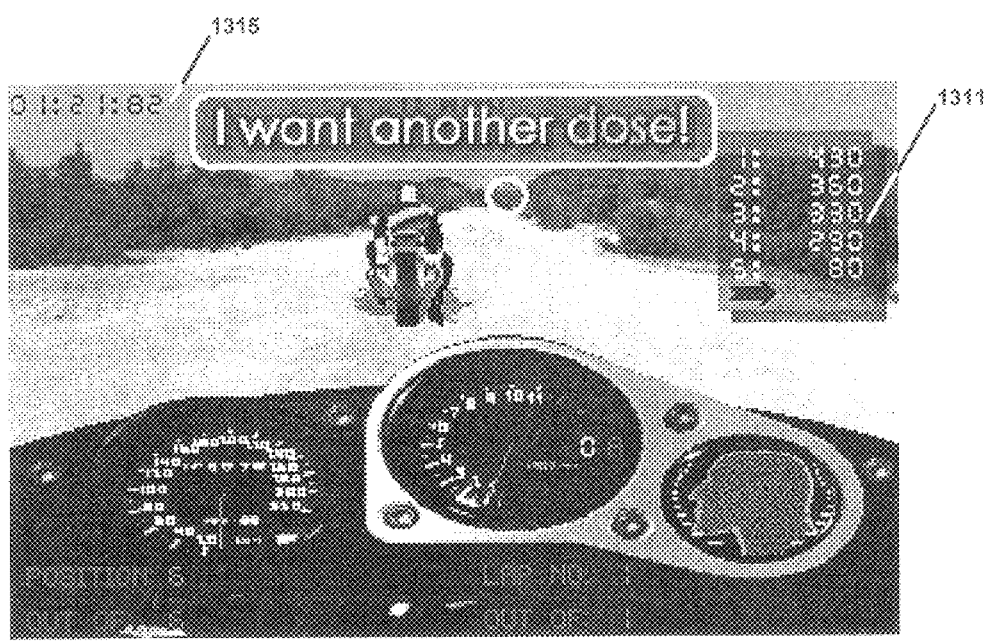
Figure 14A:
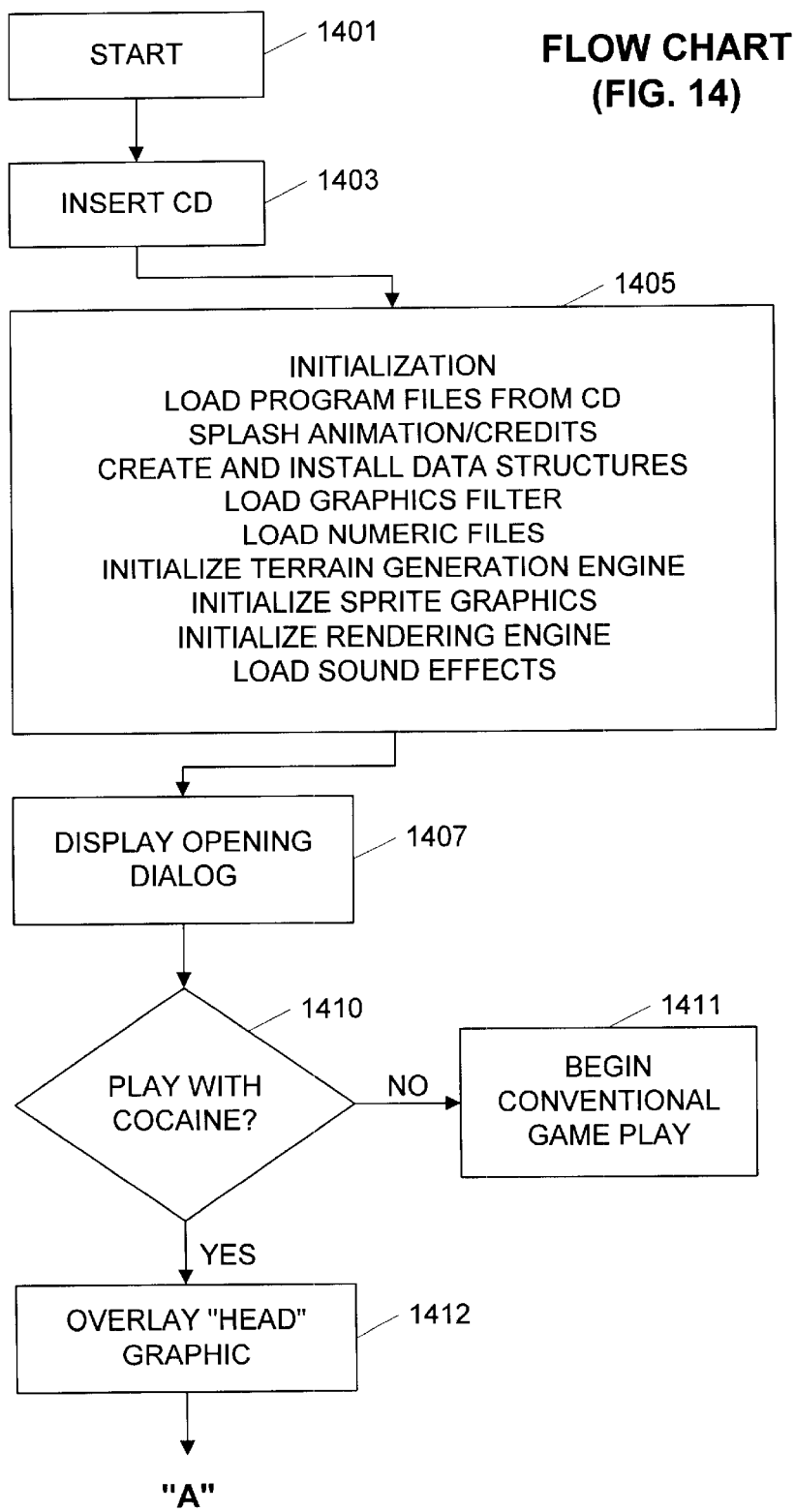
FIG. 14 is a flow chart showing the operation of the substitute and additional routines incorporated into the modified motorcycle racing game in order to implement the present invention.
Figure 14B:
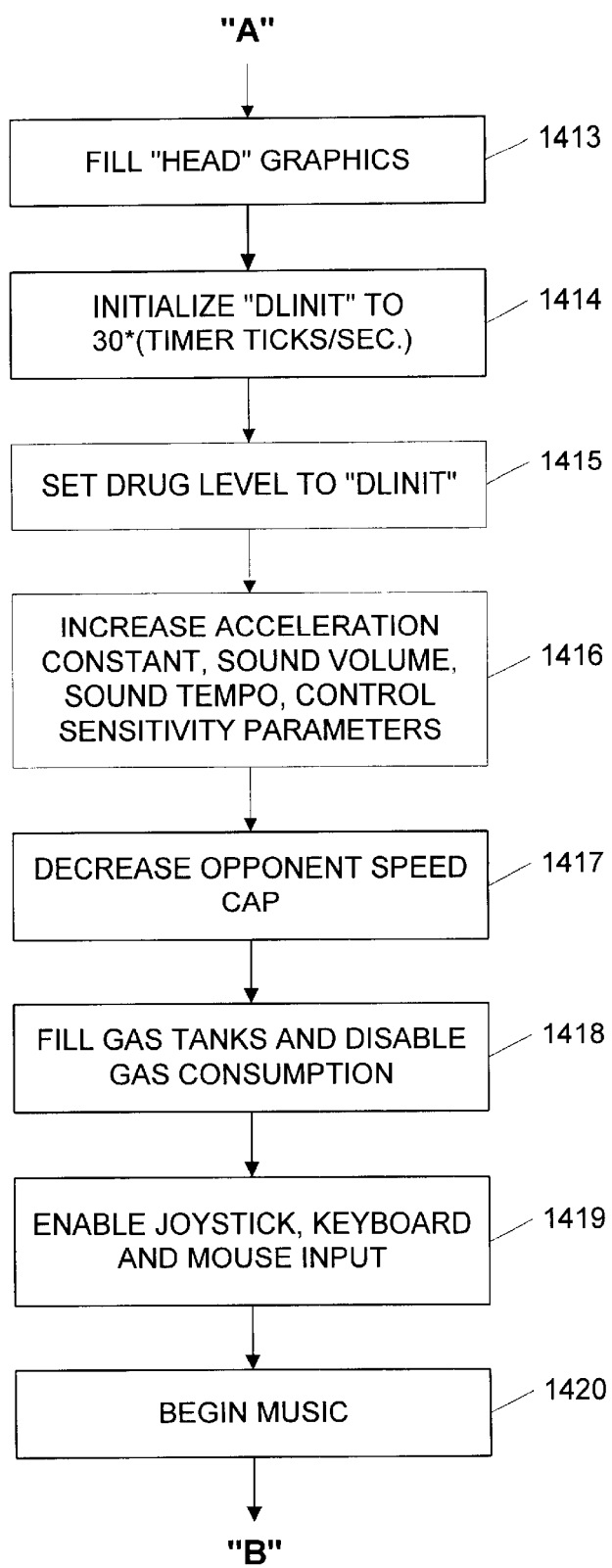
Figure 14C:
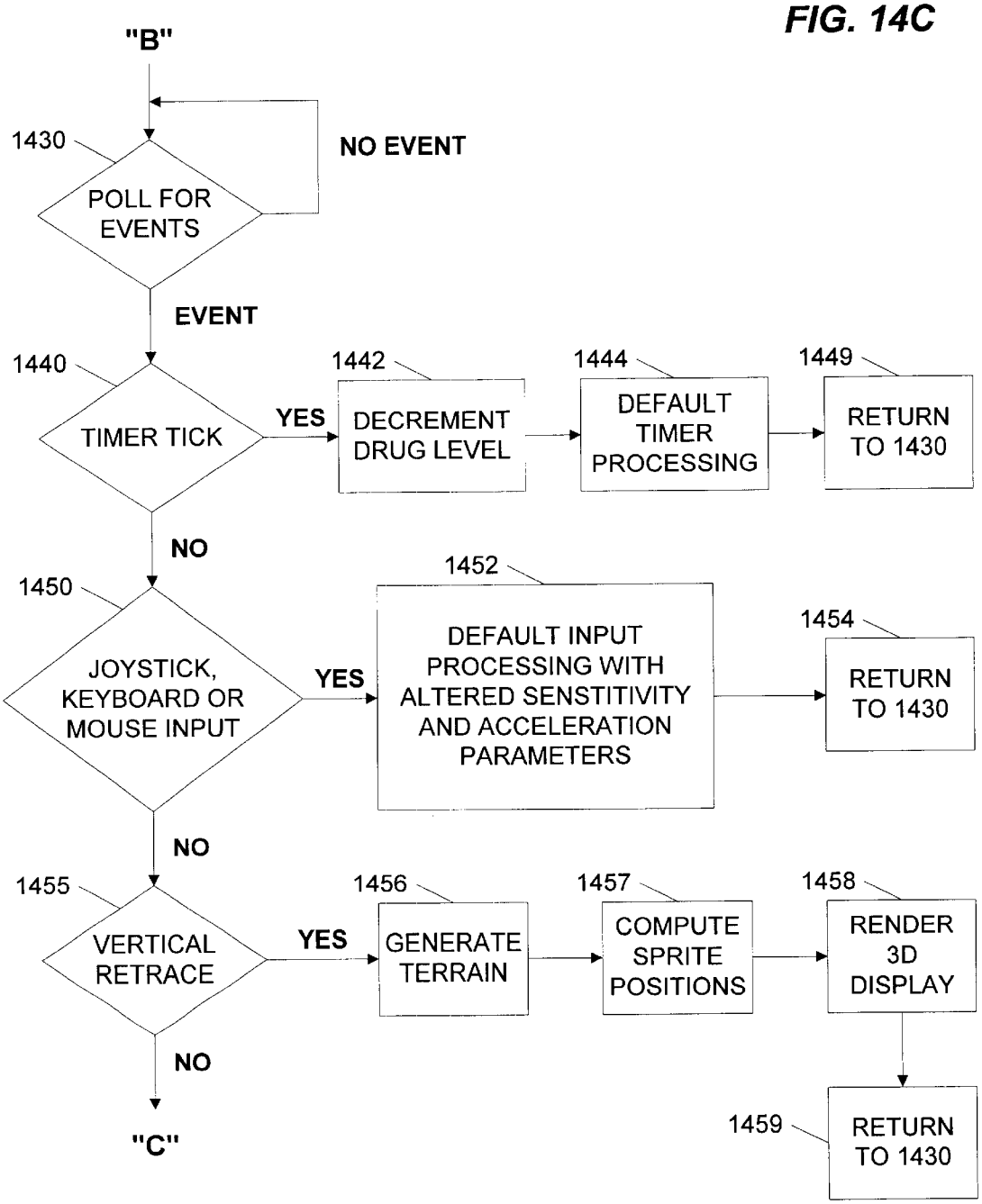
Figure 14D:
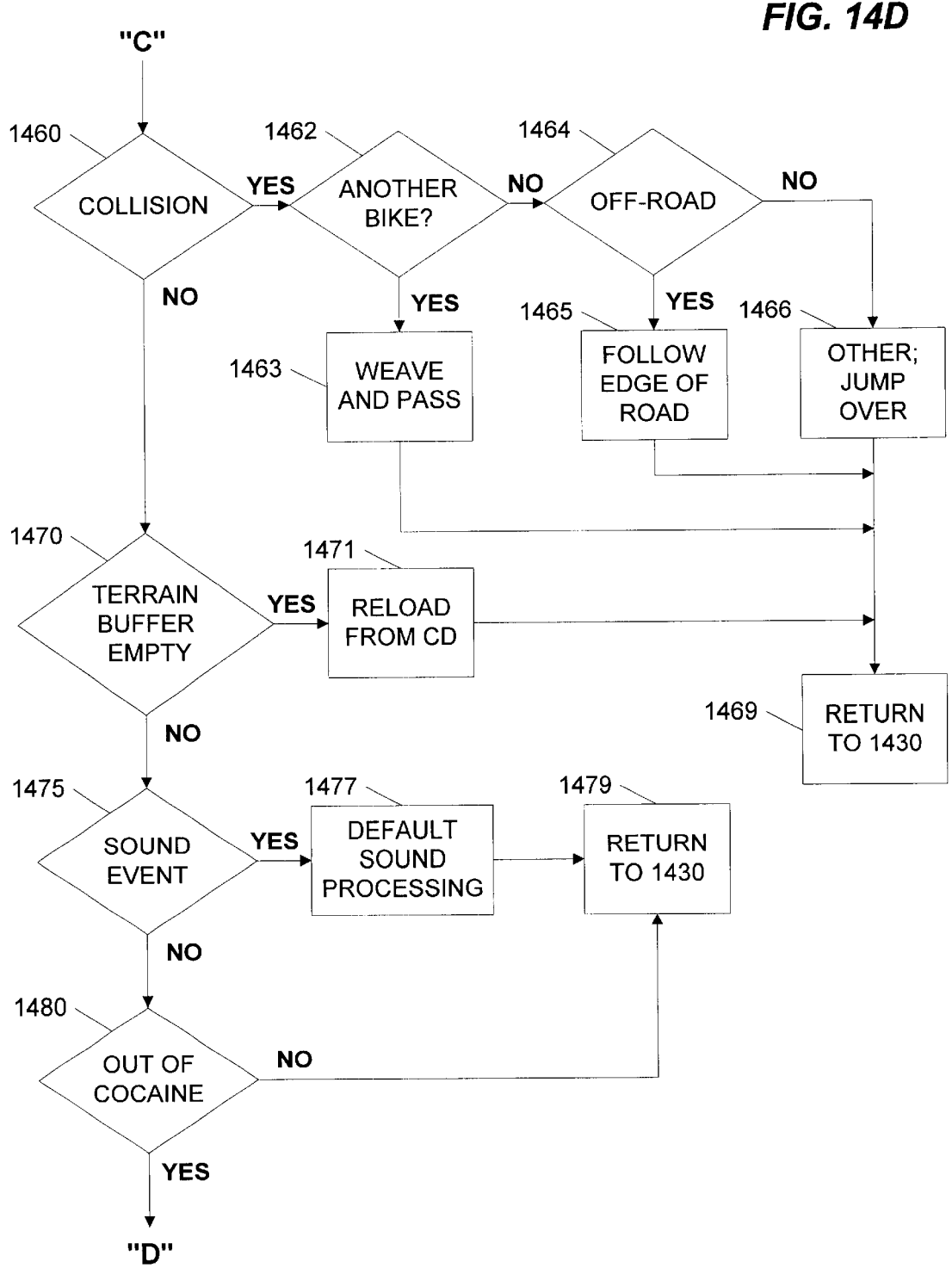
Figure 14E:
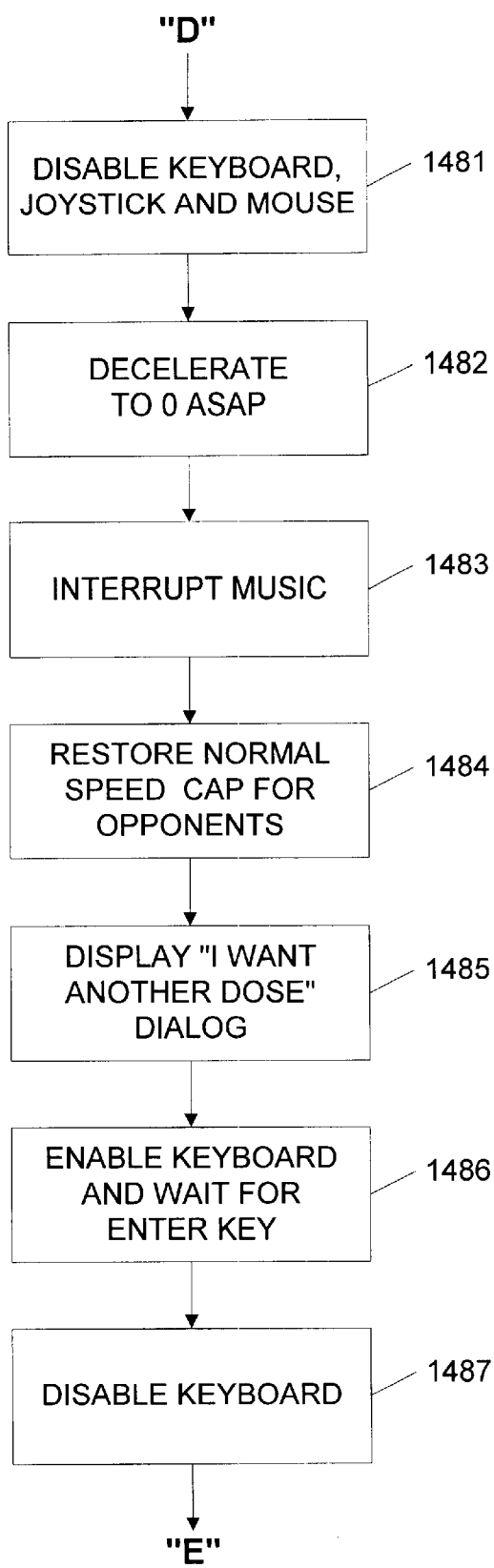
Figure 14F:
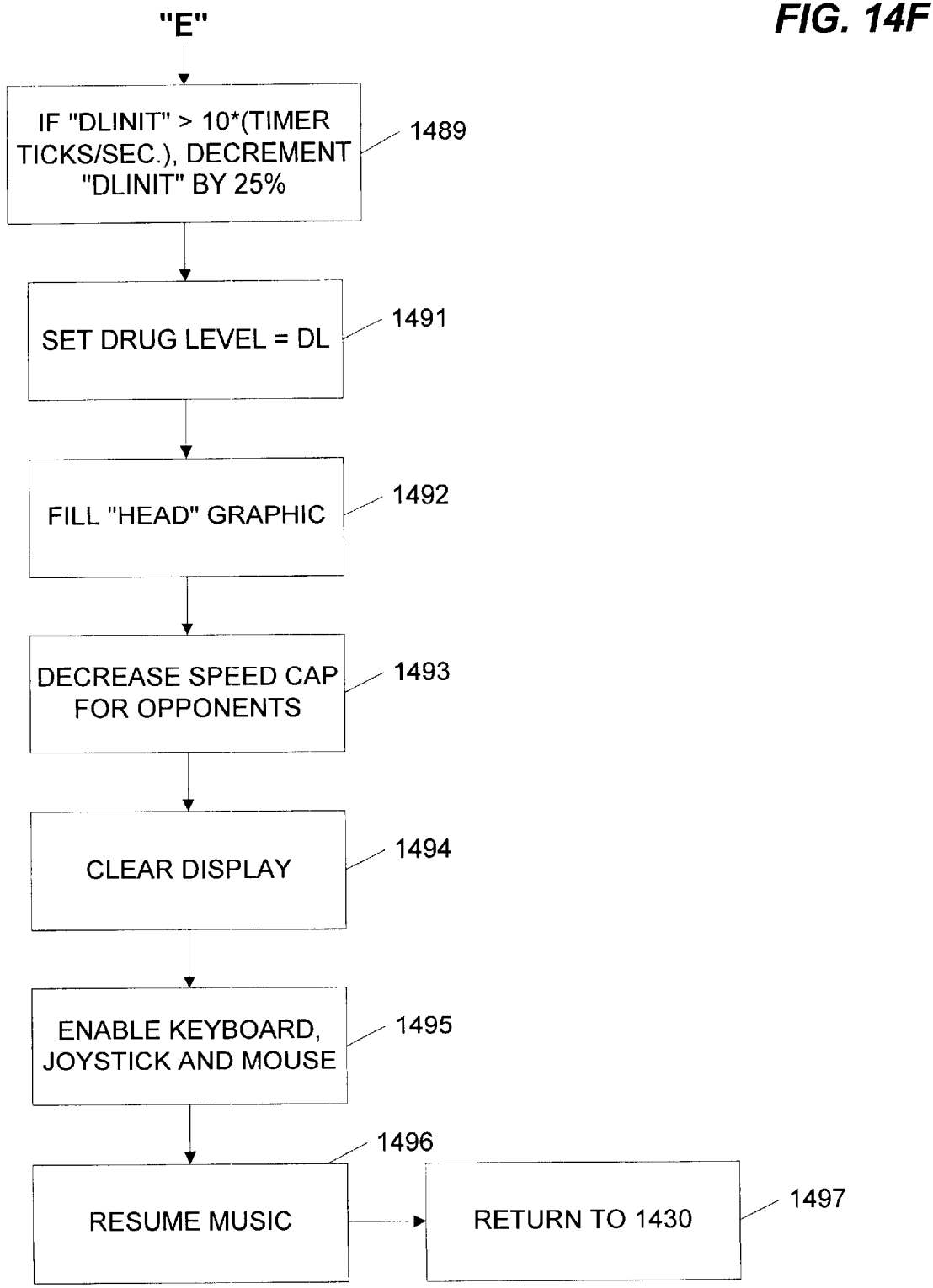

FIG. 12 shows a situation 1:14 minutes into a game, after one "refill." The player 1220 is closing in on the third-place rider 1212. However, the indicator 1253 shows that the player has just run out of drugs. Instead of overtaking rider 1212, player 1220 hits the brakes and comes to a screeching halt as shown in FIG. 13, demanding "another dose." A mere seven seconds after FIG. 12, as shown by clock 1315, the player is back in last place. By the time he/she refills, the player will be well back in last place, facing ever diminishing effects from the given dose of drugs.

The result is that, despite the seeming enhancement in his/her performance, the player falls steadily behind, and it becomes completely impossible, because of the recurring, debilitating obsession with having to get another dose, ever to catch up with the other racers.

How Does it Work?

Programming the modifications shown here involved overlaying some simple graphics (the "head" bar graph") on the screens of the existing game, continually outputting the "head" status from within the game's "event loop", manipulating a number of control variables, and providing a few substitute high-level program routines.

In Cyclemania, as in the typical action/arcade game, a large number of internal program variables are "exposed" at or near the surface of the user interface. This is to enable programming with relatively high level scripts, as well as to control gameplay attributes for purposes of testing, debugging and review. A typical situation in which similar variables are altered, albeit for entirely different reasons, are to provide "cheat codes" and "God modes" in these types of games (sometimes put in to help the testers and then left in (but not publicized) for "fun" and future development).

Cyclemania has a full complement of these exposed internal variables. In combination with some very simple source code modifications (the control sequences for the opening screen and "I Want Another Dose" dialogs), these variables can be easily utilized to accomplish the unique requirements of the invention.

FIG. 14 is a flow chart showing the operation of the substitute and additional routines incorporated in the modified Cyclemania game in order to implement the invention. Briefly, in conventional Cyclemania there is a base range of performance parameters including parameters such as player speed, opponent speed, aggressiveness, responsiveness to user inputs, sound volume and tempo, and the like. At the very beginning of the game, an extension 1407–1419 to the program's initialization routine 1405 sets up the opening drugs/no drugs dialog, and operates the animated "head" graphic and sets the timer for the first time. When the user elects at the beginning of gameplay to take cocaine 1410, the modified program simulates a drug induced state by enhancing those parameters above their base range, reducing the speed of opponents, setting the gas level to "full" and disabling the decrementation of the variable indicating gas consumption 1412–1419. In addition, three substitute routines are provided (at 1460) to execute in lieu of the ordinary collision routine. First, where the collision is with another rider, the substitute routine 1462, instead of causing a fall, causes the player's bike to scoot around the other bike (without any user steering input, and even if the evasive motion implies impossible G-forces). If the collision is with any other type of on-road object, then, no mater how big or high this object is, or how fast it is moving, or what direction it is moving in, a second substitute routine 1464 is invoked to cause the player's bike to jump over it (thereby defying gravity). (Thus, the rider on cocaine can cruise at 170 m.p.h. down the wrong side of the road straight into the radiator of an oncoming semi-trailer truck and the program will lift the bike over the truck, allowing our player to continue on his or her way at undiminished speed). Where the collision is with the side of the road (or the scenery), a third substitute routine 1466 simply tracks the bike along the edge of the road at its current speed, without regard for user input or G-forces.

The main action in the game is called from the event loop 1430, which begins upon the completion of initialization. The event loop is a continuous loop which polls for defined events and processes them until there occurs an event that forces termination of the loop. The events to be processed include a number that are processed in a conventional game, and in some cases these events are processed in the same manner as in the conventional game. Conventionally handled elements include default timer processing 1444 (based on "ticks" from the system clock); default input processing 1452 (although with altered sensitivity and acceleration parameters); graphics generation 1456, 1457 and rendering 1458 during "vertical retrace" of the video display 1455; reloading terrain data from the CD 1470,1471; and sound events 1475,1477.

However, in the version of the game with drugs, "timer tick" processing 1440, in addition to the normal default processing 1444, also affects the drug level. After a dose of cocaine has been given, the dose will reduce to zero over some determined (but diminishing) amount of time, as a result of decrementing at step 1442 in response to a timer tick event 1440. The running out of this timer triggers an "out of cocaine" event 1480. The occurrence of this event does not affect the opposing riders (except that they resume their normal speed) or stop the clock, but causes routines to be executed to do the following:

1. Decelerate the player's bike to a stop; set opponents back to normal speed 1481–1484.
2. Raise the "I want another dose" dialog and wait for as long as required for an affirmative press of the "Enter" key or an "Escape" 1485–1487.
3. Fill the animated "head" bar graph graphic 1489–1492.
4. Reset opponents to reduced speed 1493.
5. Continue (letting the player restart his/her bike) 1494–1497.

Each time the player takes a dose of drugs, the initial value (DLINIT) of the decrement counter that specifies the number of system clock ticks until the current dose runs out, is reduced by 25% until the duration of the cocaine high has been shortened to its minimum of 10 seconds 1489–1491.

The routine that reduces the "head" bar display while the player is riding is a substitute for the normal routine that operates the gas gauge. The original gas routine is not used in the modified version, and in any event, in the modified version, the gas gauge display has been overlayed by the "head graphic." The substitute routine works the same way as the normal gas gauge report, except the "head" indicator is a pure function of time determined completely by the initial setting of a decrement variable and timer ticks 1440 in the program's event loop 1430.

Options for Further Refinement and Development

There are numerous options for potential variation or embellishment over the present embodiment. For example, the ability to increase or calibrate the dosage could be provided, providing a temporary boost, further deepened depression, and the possibility of sudden death through an overdose. Randomness could be incorporated, affecting parameters such as the strength of a batch of drugs (also with the possibility of overdose). A multiplayer game could be provided, where players "on drugs" could compete against others (and/or additional computer-controlled players) playing conventionally.

Other games besides motorcycle racing games will be utilized, as the objects of the invention are best achieved if a variety of games are available. Other implementations could include any genre of interactive game that pits the skill or dexterity of the user against the computer and/or other players. Examples include other forms of racing games, other "action" games such as "shooter" games, fighting games, and sports games, among others, as well as simulations, adventure and role playing games.

Any of such games could be implemented on any of the arcade, virtual reality, videogame or computers systems discussed herein or on any future game playing platforms.

In addition, other drugs could be modeled. In the context of the present motorcycle racing game, possible examples include the following:

Opiates (heroin): "With heroin (F2) or without drugs (F1)." If F2 is selected a sound of aspiration is played indicating that the racer is snorting or "chasing the dragon." The displayed head that indicates drug level in the body gets full. All the players start racing except the stoned one who says "Whoa, what a rush" (or something of the kind), bends his head and does not move. When the level of the head has decreased a fourth, then he is ready to run in the same conditions of the cocaine option of the test trial: jumping over other cars, not falling, etc. This cycle is repeated as in the cocaine option. If F1 is selected a normal race takes place.

Alcohol: "With alcohol (F2) or without drugs (F1)." If F2 is selected, the screen gets blurred and the rest takes place in the same manner as with the cocaine option. The only difference is that with alcohol, crashes take place as in the normal option and he takes a bit longer to recover from them.

In summary, after an initial representation of the differential "behavioral and/or subjective" effects of drugs (i.e., cocaine=excitement, heroin=drowsiness, alcohol=blurred vision), the well being and sense of power that these drugs offer are similar ("what a rush", speed, etc.). These and other different effects of each drug could also be represented depending on the type of game or action, the potential "personality" of the player, the dosage of the drug taken or a combination of these variables. For instance, in a game with two possible levels of cocaine intake, the larger dose would "paralyze the player" and with the lower dose the player would behave as we see in the present game. More complex physiological sounds or effects can be added, so that the player will have a deeper knowledge of the internal effects of the drug. For instance, heart rate could also be displayed. In the case of cocaine, heart rate would be higher at the beginning of the drug intake and slowly decrease in parallel with the decrease of drug level head marker, giving a more realistic effect to the experience of playing "stoned."

While discussed above in the context of the example motorcycle racing game, using similar techniques, those skilled in the art could readily simulate the effects of different drugs in the different modes or versions of any game constructed in accordance with the principles of this invention.

It is apparent from the foregoing that a new system and method have been developed which demonstrate the great power of interactive game media to deliver a compelling anti-drug message to youngsters. It is my hope that this invention will be successfully used to keep kids from ever using drugs. While the presently existing implementation has been described in greatest detail, it will be apparent to those skilled in the art that up-to-the-minute interactive games and media could be substituted, and the order of play and interaction varied, without departing from the scope and spirit of the invention, as defined in the following claims.

I claim:

1. A system adapted to the use of discouraging drug use by the user of said system, comprising:
    a processor for playing an interactive game program;
    an interactive game program, wherein the game characteristics thereof, being one or more of the group of characteristics consisting of the speed and intensity of audiovisual output, responsiveness to input, and gameplay characteristics of said game program, may be controlled by a set of elements comprising:
        data recorded in connection with said program which sets a base range of parameters for controlling said game characteristics;
        an input control whereby the user is presented the simulated opportunity to ingest a dose of a drug;
        a circuit, responsive to said input, to alter at least one of said parameters in accordance with characteristics of said drug, so as to cause the execution of said program to simulate the drug-influenced state resulting from said ingestion, and enhance said game characteristics;
        a timer, and a circuit responsive to said timer to further alter said at least one parameter in a manner responsive to the elapsed time from said ingestion, as indicated by said timer, so as to reduce said enhancement of said game characteristics, until the same are reduced below said base level;
        instructions in the instruction set of said processor that cause the execution to said program to loop, in a manner responsive to said timer, so as to represent the user with the opportunity to ingest a further dose of said drug, and to continue the execution of said program in a manner responsive to said choice.

2. The system of claim 1, wherein upon repeated ingestion of drugs, the elapsed time allowed before further altering said at least one parameter and consequent reduction in said game characteristics, is reduced.

3. The system of claim 1, wherein the function of re-presenting to the user the opportunity to ingest a further dose of drugs takes time, during which said at least one parameter is further altered so as to further reduce said game characteristics.

4. The system of claim 1, wherein the function of re-presenting to the user the opportunity to ingest a further dose of drugs requires the user either to answer affirmatively or quit the program, and wherein during any delay resulting from having to make such decision, said at least one parameter is further altered so as to further reduce said game characteristics.

5. The system of claim 1, wherein the user has a character in the game.

6. The system of claim 1, wherein the game is a multi-player game.

7. The system of claim 1 wherein the dosage of drugs to ingest is variable.

8. The system of claim 7, wherein the dosage given may be an overdose.

9. The system of claim 7, wherein the variable dosage is subject to randomization.

10. The system of claim 7, wherein ingesting the drug has varying effects, depending on the dosage taken.

11. The system of claim 1, wherein said audiovisual output form of game characteristic includes simulated physiological feedback representative of a physical condition within the user's body.

12. The system of claim 1, wherein an input is provided to specify the personality of the player, which influences the course of gameplay provided.

13. The system of claim 1, wherein gameplay is altered depending on one or more inputs from the following group: type of game or action, personality of the player, and dosage of drug taken.

14. A method for discouraging drug use, said method being implemented through the use of an interactive game program, and by controlling game characteristics thereof, said characteristics being one or more characteristics selected from the group consisting of the speed and intensity of audiovisual output, responsiveness to input, and gameplay characteristics of said game program, comprising the following steps:
    initially setting parameters that control the level of said game characteristics, so as to establish a base level of said game characteristics;
    presenting to said user the simulated opportunity to ingest a dose of a drug;
    simulating the drug-influenced state resulting from said ingestion, by altering at least one of said parameters so as to enhance said game characteristics;
    further altering said at least one parameter in a manner responsive to the elapsed time from said ingestion, so as to reduce said enhancement of said game characteristics, until the same are reduced below said base level;
    in further response to said elapsed time, re-presenting to said user the opportunity to ingest a further dose of said drug, and continuing said program in a manner responsive to said choice.

15. The method of claim 14, wherein upon repeated ingestion of drugs, the elapsed time allowed before further altering said at least one parameter and consequent reduction in said game characteristics, is reduced.

16. The method of claim 14, wherein the step of re-presenting to the user the opportunity to ingest a further dose of drugs takes time, during which said at least one parameter is further altered so as to further reduce said game characteristics.

17. The method of claim 14, wherein the step of re-presenting to the user the opportunity to ingest a further dose of drugs requires the user either to answer affirmatively or quit the program, and wherein during any delay resulting from having to make such decision, said at least one parameter is further altered so as to further reduce said game characteristics.

18. The method of claim 14, wherein the user has a character in the game.

19. The method of claim 14, wherein the game is a multiplayer game.

20. The method of claim 14, wherein the dosage of drugs to ingest is variable.

21. The method of claim 20, wherein the dosage given may be an overdose.

22. The method of claim 20, wherein the variable dosage is subject to randomization.

23. The method of claim 20, wherein ingesting the drug has varying effects, depending on the dosage taken.

24. The method of claim 14, wherein said audiovisual output form of game characteristic includes simulated physiological feedback representative of a physical condition within the user's body.

25. The method of claim 14, wherein an input is provided to specify the personality of the player, which influences the course of gameplay provided.

26. The method of claim 14, wherein gameplay is altered depending on one or more inputs selected from the group consisting of: type of game or action, personality of the player, and dosage of drug taken.

27. A machine readable medium for storing a computer program, on which there has been recorded a program for carrying out the method of claim 14.

28. A machine readable medium for storing a computer program, on which there has been recorded a program for carrying out the method of claim 15.

29. A machine readable medium for storing a computer program, on which there has been recorded a program for carrying out the method of claim 16.

30. A machine readable medium for storing a computer program, on which there has been recorded a program for carrying out the method of claim 17.

31. A machine readable medium for storing a computer program, on which there has been recorded a program for carrying out the method of claim 18.

32. A machine readable medium for storing a computer program, on which there has been recorded a program for carrying out the method of claim 19.

33. A machine readable medium for storing a computer program, on which there has been recorded a program for carrying out the method of claim 20.

34. A machine readable medium for storing a computer program, on which there has been recorded a program for carrying out the method of claim 21.

35. A machine readable medium for storing a computer program, on which there has been recorded a program for carrying out the method of claim 22.

36. A machine readable medium for storing a computer program, on which there has been recorded a program for carrying out the method of claim 23.

37. A machine readable medium for storing a computer program, on which there has been recorded a program for carrying out the method of claim 24.

38. A machine readable medium for storing a computer program, on which there has been recorded a program for carrying out the method of claim 25.

39. A machine readable medium for storing a computer program, on which there has been recorded a program for carrying out the method of claim 26.

40. A system in accordance with claim 1 further comprising a plurality of processors communicating over a network and distributing the tasks of said system among said processors.

* * * * *